United States Patent [19]

Grzebielski

[11] 4,327,391
[45] Apr. 27, 1982

[54] MOTOR PROTECTION CIRCUIT

[75] Inventor: Chester J. Grzebielski, Grafton, Wis.

[73] Assignee: Allen-Bradley Company, Milwaukee, Wis.

[21] Appl. No.: 117,059

[22] Filed: Jan. 31, 1980

[51] Int. Cl.³ ............................................. H02H 7/085
[52] U.S. Cl. ....................................... 361/31; 361/96; 361/87
[58] Field of Search ..................... 361/31, 96, 94, 97, 361/87, 23, 22; 318/447, 474

[56] References Cited

U.S. PATENT DOCUMENTS

| | | | |
|---|---|---|---|
| 3,419,757 | 12/1968 | Steen | 361/96 |
| 3,831,061 | 8/1974 | Boyd | 361/94 |
| 4,021,700 | 5/1977 | Ellis-Anwyl | 361/31 X |

OTHER PUBLICATIONS

Reliance Electric Company, Drawing No. 29651, dated Sep. 27, 1977, titled–"Wiring Diagram"–56 Power Unit.

Primary Examiner—Patrick R. Salce
Attorney, Agent, or Firm—Andrus, Sceales, Starke & Sawall

[57] ABSTRACT

A protection circuit protects a motor against excessive energizing current and exposure time conditions in accordance with the inverse relationship existing between these quantities. The circuit includes a pulse generator which generates a pulse train signal having a pulse rate proportional to the magnitude of the excess current applied to the motor. The pulses of the pulse train signal are counted up in a counter to a predetermined number. When that number is reached, the circuit operates to disconnect the motor. The greater the excess motor current, the higher the pulse rate of the pulse train signal, and the shorter the counting time required to obtain the predetermined number. The inverse relationship between excess current magnitude and exposure time is thus obtained. The circuit indicates when excess current is being applied to the motor and retains that indication after disconnection.

10 Claims, 2 Drawing Figures

MOTOR PROTECTION CIRCUIT

Electric motors are designed to operate for extended periods without thermal or other damage at specified energizing current levels, usually termed "rated current." The possibility of damage to the motor by operation at current levels in excess of full or 100% rated current grows and approaches certainty as the amount of excess current and the time period over which the motor is exposed to such currents increase.

To avoid damage, the greater the excess current, the shorter the exposure time must be. Thus, while a d.c. motor of modern construction might conservatively withstand operation at 150% rated armature current for up to 60 seconds without damage, for currents greater than this the exposure time must be shorter. For currents less than 150% rated current, the exposure time may be longer. The excess current magnitude and the exposure time are thus inversely related.

Protective equipment is commonly provided to deenergize the motor under excess current or other potentially damaging conditions. A variety of means may be employed for this purpose. For example, the energizing current may be passed through a resistor or magnetic field generator which disconnects the motor when it is subjected to excess currents. Or, a temperature sensor may be provided inside the motor, typically in a winding, to sense heat generated in the motor by excess current and operate the disconnect means.

However, these approaches are subject to certain drawbacks. The resistive or magnetic disconnect elements must be sized to handle the actual energizing currents to which the motor may be subjected and are thus of considerable relative size. The necessary characteristics of a temperature sensor vary with the rating of the motor so that an inventory of different sized temperature sensors must be maintained for use with motors of different rating. The temperature sensor is often inserted in the windings of the motor during fabrication to obtain the most advantageous positioning. This lends a certain inflexibility to the use of such elements. With both types of protective equipment, it may be necessary to manually reset the disconnect means either on the motor or in its wiring.

Further, such previously used means may not indicate the presence of excess current in the motor prior to disconnecting it. This prevents the operator from taking corrective action before the critical excess current-exposure time conditions occur. When the motor is disconnected, signals indicative of the fault, such as excess current, are lost, making it difficult to trace the problem to the cause.

The present invention provides an improved motor protection circuit which protects the motor from excessive current and exposure time conditions in accordance with the inverse relationship existing between these two quantities. The circuitry of the present invention employs a control signal proportional to motor energizing current rather than the energizing current itself, thereby contributing to the small size and compactness of the circuitry. The exact current and time conditions at which protection is provided may be altered to lend flexibility to the use of the circuitry in protecting motors of various types and sizes. The circuit permits the motor to be easily reconnected to its power source after an appropriate cooling off period. Further, the circuit is protectively responsive to the cumulative effect of sequential operating periods which approach but do not exceed critical current-time criteria.

A further feature of the present invention is to provide a motor protection circuit which provides an indication that the motor is being subjected to excess current before the critical exposure time is reached so as to permit corrective action to be initiated. In the event the protective circuit disconnects the motor, an indication of the cause of the disconnection, such as excess motor current, or other fault in the motor or power supply, is retained to facilitate troubleshooting.

The present invention includes circuitry which generates a pulse train signal having a pulse rate proportional to the magnitude of the excess current applied to the motor. The pulses of the pulse train signal are counted in a counter to a predetermined number. When that number is reached, the circuit is operated to provide protective action to the motor as by disconnecting the energizing current from the motor. The greater the excess motor current, the higher the pulse rate in the pulse train signal and the shorter the counting time required to attain the predetermined number. The inverse relationship between excess current magnitude and exposure time is thus obtained in the circuit.

After disconnection of the motor, the pulse rate of the pulse train signal is reduced and the counter counts down to establish a cooling off period for the motor. When the counter has counted down to zero, the protective circuit is rendered resettable to permit the motor to be reenergized.

The output circuit is so constructed that an indication is provided whenever the motor is subjected to excess current so that corrective action may be taken before the critical exposure time is reached. If the motor is protectively disconnected, a latch circuit in output circuit provides an indication of the cause which survives the disconnection.

The invention may be further understood with the aid of the drawing containing the following figures.

Figure 1:
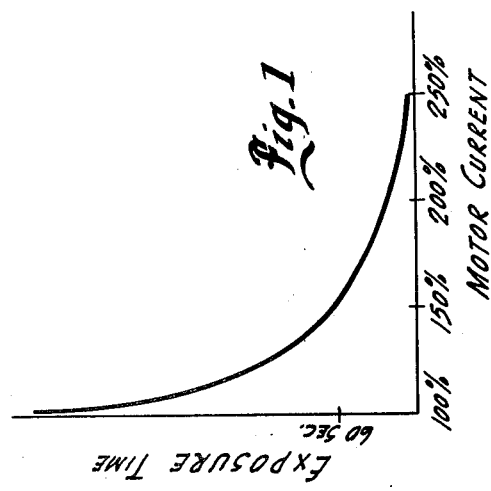
FIG. 1 is an exposure time-excess current graph for an electric motor.

FIG. 1 shows typical exposure time-excess current conditions which may be established to prevent damage to an electric motor. The ordinate of the graph of FIG. 1 is scaled in exposure time. The abscissa of the graph is scaled in excess current over full or 100% rated current. As will be seen from the graph of FIG. 1, the greater the amount of excess current, the shorter must be the exposure time in order to avoid damage to the motor. Thus, the motor may be operated at 110% of rated current for considerable periods without damage. At 150% of rated current, the motor should be operated for no more than 60 seconds. At 250% rated current, the motor may be operated only momentarily if damage is to be avoided.

Figure 2:
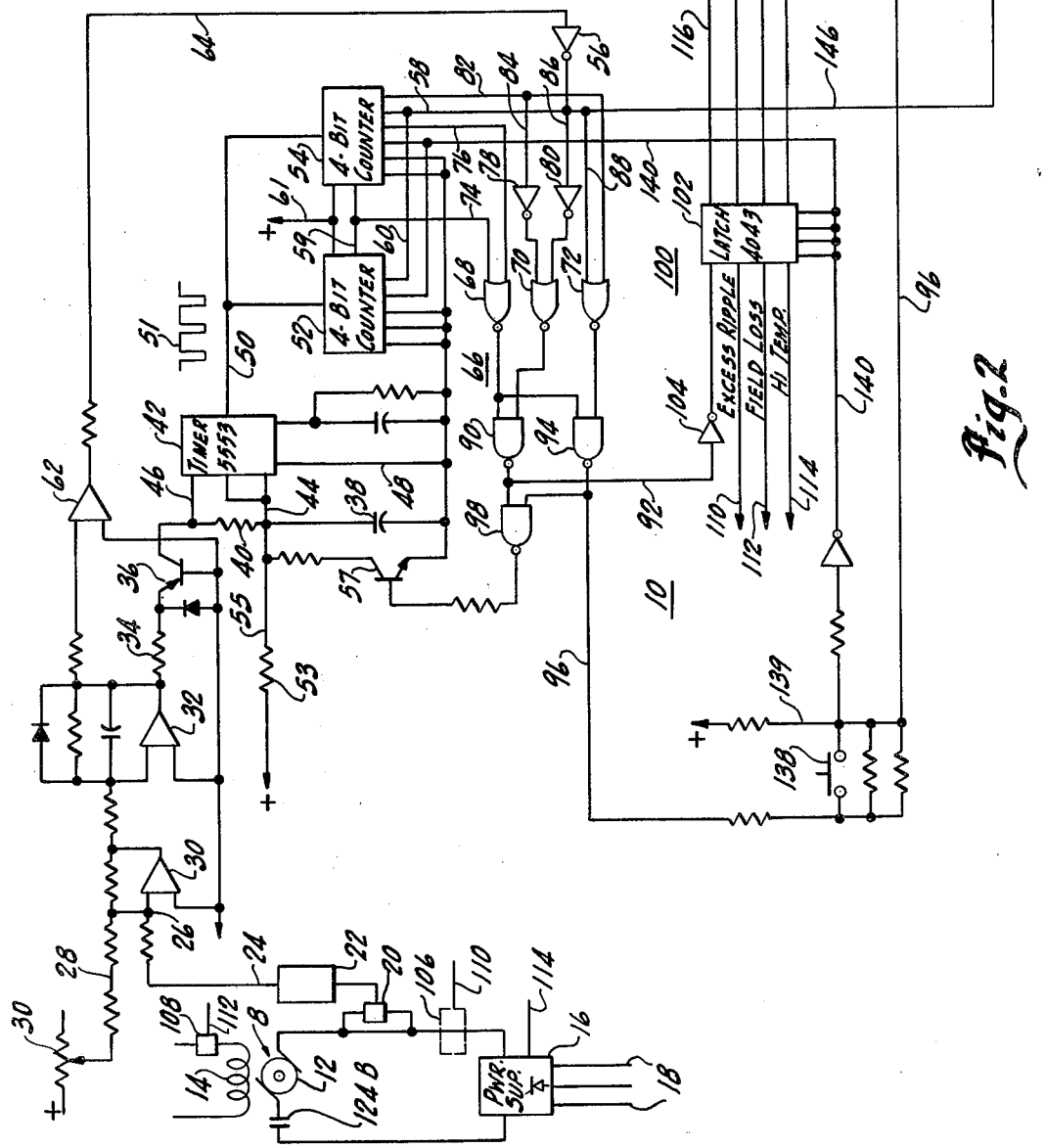
FIG. 2 is a schematic diagram of the motor protection circuit of the present invention.

In FIG. 2, motor 8, to which excess current and other protection is provided by motor protection circuit 10, may be a d.c. motor having armature 12 and field 14. Motor 10 is energized by power supply 16 connected to a.c. power lines 18.

A signal proportional to the energizing current of motor 10 is taken from a current sensing means shown diagrammatically as shunt 20. The energizing current signal from sensor 20 is passed through isolation circuit 22 to conductor 24 and summing junction 26 in the input circuitry of circuit 10. A reference signal is also applied to summing junction 26 in conductor 28 from reference signal source 30. The magnitude of the reference signal in conductor 28 is set to correspond to 100% rated motor current of motor 8.

The difference signal between the reference signal in conductor 28 corresponding to full rated current and the motor current signal in conductor 24 from motor 10 is provided to the input of input amplifier 30. The output of amplifier 30 is provided to amplifier 32 which, with its associated input and feedback circuitry, acts as an inverter and scaler for the difference signal from summing junction 26. Amplifiers 30 and 32 may be operational amplifiers.

The output signal of amplifier 32 has a magnitude indicative of the difference between the reference signal and the motor current signal. This signal is supplied to resistor 34 and transistor 36 forming a current generator that provides an output current proportional to the difference signal at summing junction 26. The polarity of the output signal of amplifier 32 indicates whether the motor current signal is greater or less than the reference signal. The signal characteristics and input circuitry elements are so selected and arranged that the polarity of the output of amplifier 32 will be such as to bias transistor 36 on when the motor current signal in conductor 24 is in excess of the reference signal in conductor 28.

The current from transistor 36 is supplied to capacitor 38 through resistor 40. The magnitude of the current determines the charging rate of capacitor 38 and hence the instantaneous voltage across the capacitor when charging.

Capacitor 38 is connected to timer 42 by conductors 44 and 46. Timer 42 may be that element made and sold by Teledyne under the component designation 355 or made and sold by Motorola, National Semiconductor, Texas Instruments, and others under the component designation 555. When the charge on capacitor 38 reaches a predetermined voltage, termed the "tripping voltage", the capacitor is discharged through resistor 40, conductor 46, timer 42 and conductor 48. The normally high output of timer 42 in conductor 50 is momentarily removed as capacitor 38 discharges, to form a pulse in the output signal. Capacitor 38 then recharges at a rate determined by the current from transistor 36 and the process repeats itself to form a sawtooth voltage across the capacitor and the pulse train output signal 51 shown adjacent conductor 50 in FIG. 2. Capacitor 38, timer 42, and the associated circuitry thus form a pulse generating means.

The frequency or pulse rate of pulse train output signal 51 is directly proportional to the excess current to which motor 10 is subjected since the greater the excess current, the greater the difference signal at summing junction 26, the greater the capacitor charging current, the shorter the capacitor charging period, and the more pulses per unit time in pulse train signal 51.

Capacitor 38 may also be charged by the current through resistor 53 in conductor 55 from a bias voltage source. When no current is provided from resistors 34 and 40 and transistor 36, capacitor 38 is charged solely from conductor 55. The magnitude of the bias voltage source connected to conductor 55 is selected such that the charging rate of capacitor 38 from that source is considerably slower than that which can be provided by resistors 34 and 40 and transistor 38. For example, the current from conductor 55 may charge capacitor at one tenth the rate at which it can be charged from transistor 36. The pulse rate of pulse train signal 51 is correspondingly slower.

Transistor 57 is connected across capacitor 32 to short out the capacitor when it is turned on and to remove the pulse generating input signal to timer 42.

The pulse train signal 51 in conductor 50 is provided to two up-down four bit binary counters 52 and 54 which may be formed of CMOS or TTL elements. Counters 52 and 54 are connected in series so that the counters can count up to a total of 255 bits before the counters are filled. The series connection may be made through conductor 59 which connects the carry-out output of counter 52 to the carry-in input of counter 54. The carry-out output of a counter such as 52 or 54 has one signal state when the counter is full and counting up and when the counter is empty and counting down. It has a different signal state when the counter is other than in those two conditions. Counters 52 and 54 are cleared on start up by the signal in conductor 61.

Whether counters 52 and 54 count up or count down is determined by the signal from inverting amplifier 56 in conductors 58 and 60. The input to inverting amplifier 56 is a signal from amplifier 32 which indicates whether the motor current signal in conductor 24 is greater or less than the reference signal in conductor 28, as by the polarity of that signal. For this purpose, the output of amplifier 32 is connected to amplifier 62. Amplifier 62 is connected through conductor 64 to the input of inverter 56.

The output of counters 52 and 54 are provided to logic circuit 66. Logic circuit 66 includes three input NOR gates 68, 70, and 72. NOR gate 68 is used to indicate when the counting means comprised of counters 52-54 is in either the full condition or the empty condition. NOR gate 70 is used to indicate that the counting means is actually in the full condition while NOR gate 72 is used to indicate when the counter is in the empty condition.

The inputs to NOR gate 68 are connected to the carry-out outputs of counters 52 and 54 by conductors 59-74 and conductor 76. The inputs to NOR gate 70 are connected through inverting amplifiers 78 and 80 to the fourth binary digit of counter 54 in conductors 82-84 and to the count up-count down signal from inverter 56 in conductor 86, respectively. The inputs to NOR gate 72 are connected to the fourth binary digit of counter 54 in conductor 82 and to the count up-count down signal from inverter 56 in conductor 88.

The outputs of NOR gates 68 and 70 are applied to the inputs of NAND gate 90, the output of which is an indication that the counter 52-54 is full. The output of NAND gate 90 is provided to output circuitry, hereinafter described, in conductor 92 which disconnects motor 10 from power supply 16 protect the motor against damage.

The outputs of NOR gates 68 and 72 are connected to the inputs of NAND gate 94 which indicates that the counters 52-54 are empty. The output of NAND gate 94 is connected to the output circuitry in conductor 96 to permit the motor to be reconnected to power supply 16 after a time delay sufficient to cool motor 8. The outputs of NAND gates 90 and 94 are connected to the inputs of NAND gate 98 which is connected to the base of transistor 57.

Output circuit 100 includes a trip out latch circuit 102 which may be that component manufactured by Motorola under the component designation 4043 and termed a "Quad NOR RS latch." The output from NAND gate 90 is connected through inverter 104 and conductor 92 to a set input of latch circuit 102. Signals indicative of fault conditions in the motor other than excessive current, such as excessive a.c. ripple in the d.c. energizing current, loss of motor field energization, or high temperature conditions in the thyristor heat sinks in power supply 16 may also be provided to set inputs of circuit 102 from a.c. ripple sensor 106, motor field sensor 108, and a temperature sensor, in conductors 110, 112, and 114, respectively.

The outputs of latch circuit 102 are provided to the fault indication and disconnect portion of output circuit 100. The output of latch circuit 102, responsive to the excess current condition input in conductor 92, is provided in conductor 116 through inverter 118, indicator light 120, to the base of transistor 122. The emitter-collector circuit of transistor 122 is connected in series with the coil 124a of a relay, the contracts 124b of which connect and disconnect motor 10 and power supply 16.

The outputs controlled by the a.c. ripple signal in conductor 110, the field loss signal in conductor 112, and the high thyristor temperature signal in conductor 114 are similarly provided through inverting amplifiers 126, 128 and 130, indicator lights 132, 134, and 136 to the base of transistor 122.

The output of NAND gate 94 in conductor 96 is connected to reset switch 138 for motor 8. Reset switch 138 provides a signal in conductor 140 to the reset inputs of latch circuit 102 corresponding to the set inputs receiving the signals in conductors 92, 110, 112 and 114. The signal from conductor 139 resets latch circuit 102 on start up. The signal in conductor 140 is also provided to counters 52-54 to reset the counters. The signal in conductor 96 from NAND gate 94 is provided through inverter 142 to indicator light 144. The output of inverter 56 containing the updown count signal is provided in conductor 146 through inverter 148 to indicator light 150.

In operation, when excess current, for example, 150% of rated current is applied to motor 10, a difference signal will be generated at summing junction 26. This signal will be proportional to the difference between the reference signal in conductor 28 corresponding to rated current and the signal in conductor 24 indicative of actual motor current. The difference signal provided to the input of amplifier 30 thus represents the 50% excess current.

The polarity of the signal at summing junction 26 to amplifier 30 is such that amplifier 32 causes transistor 36 and resistor 34 to generate a current proportional to the excess motor current. This current will similarly establish the charging rate of capacitor 38 and the pulse rate of pulse signal 51 from timer 42 in conductor 50 proportional to the excess motor current. Transistor 57 is biased off by the output signal from NAND gate 98.

The pulse train signal is applied to counters 52 and 54 which may be assumed to be empty for purposes of explanation. The polarity of the signal from amplifier 32 to amplifier 62 and from amplifier 62 to inverter 56 is such as to provide a signal in conductor 58 that causes the counters to count up.

The signal from inverter 56 is provided in conductor 146 through inverter 148 to indicator 150. Anytime counters 52 and 54 are counting up, indicator 150 will be lit. This advises the operator that the motor is then being subjected to excess current. The operator may initiate corrective action to reduce the motor current before the critical exposure time is reached. Disconnection of the motor and the necessary cooling time delay before it can be restarted can thus be avoided.

Counters 52 and 54 commence counting the pulses of pulse train signal 51. The pulse rate of signal 51 is so chosen that counters 52 and 54 will reach their full count of 255 pulses at the maximum time permitted for the overload of 150% of rated current to motor 10. In the example given above, this would be sixty seconds. The pulse rate characteristics of pulse train signal 51 is determined by the selection of components, such as resistors 34 and 40, capacitor 38, and timer 42. The operation of logic circuit 66 is such that whenever counts are present in counters 52-54 a signal will be provided in conductor 96 which disables reset switch 138 and illuminates indicator 144. This prevents actuation of the reset switch from interfering with the operation of circuit 10.

When the maximum count is reached in counters 52-54, signals are provided in conductors 55-74 and conductor 76 to NOR gate 68 to alter the output of NOR gate 68. This output is indicative of the fact that the counters are either empty or full. That the counters are full, rather than empty, is determined by the inputs from NOR gate 68 and NOR gate 70 to NAND gate 90. The inputs to NOR gate 70 include the signal from inverter 58 that the counters 52-54 are counting up and the signal in conductor 58 from the fourth bit of second counter 54 indicating that the counters are full. The coincidental inputs from NOR gates 68 and 70 to NAND gate 90 generates a signal in conductor 92 through inverter 104 to circuit 102. This input causes circuit 102 to provide an output in conductor 116 through inverting amplifier 118 and indicator 120 to the base of transistor 122. The signal through indicator 120 illuminates the indicator showing the operator that excess current-exposure time conditions in the motor have exceeded those established by protective circuit 10. The signal to the base of transistor 122 biases that transistor on, energizing relay coil 124a to open relay contacts 124b and disconnect motor 8 from power supply 16 to terminate the overload condition so that the motor may commence cooling down.

The illumination of indicator 144 by the output signal from NAND gate 94 in conductor 96 advises the operator that reset button 138 is inoperative until the end of the cooling off period when indicator 144 is extinguished.

The output signal from NAND gate 90 is also provided to an input of NAND gate 98 which provides a signal to the base of transistor 57, biasing that transistor on to short out capacitor 38 so that no additional pulses can be provided to the already full counters 52 and 54.

When motor 8 is disconnected from power supply 16 by the opening of relay contacts 124b, the current signal in conductor 24 is reduced to zero. This reverses the polarity of the signal from summing junction 26 to input amplifier 30 and the output to amplifier 32. The output of amplifier 32 is similarly reversed, turning off transistor 36 terminating the charging current to capacitor 38. The reversed polarity output signal from operational amplifier 32 to amplifier 62 reverses the polarity of the output signal from amplifier 62 and the output of inverter 56 to count down condition. The count down signal is provided in conductors 58-60 to counters 52 and 54 to place them in the count down mode. The signal from inverter 56 in conductor 146 to inverter 148 and indicator 150 turns off the indicator to advise the operator that the overload condition has been terminated by the deenergization of motor 8. Indicator 120 remains lit so that the operator can ascertain that the cause of the shut down was excessive current in the motor and can remedy the cause.

The count down signal is also provided in conductor 86 through inverter 80 to an input of NOR gate 70. This alters the output of NOR gate 70 to NAND gate 90, altering the output of NAND gate 90 to NAND gate 98 to turn off transistor 57.

With transistor 57 non-conductive, capacitor 38 may be charged by the signal in conductor 55. As noted, supra, the charging rate of capacitor 38, responsive to the signal in conductor 55, will be considerably less than that provided by transistor 36 responsive to the 150% overload current. The charging of capacitor 38 from conductor 55 generates a pulse train 51 in conductor 50 of lower frequency than that generated by transistor 36.

Counters 52 and 54 commence counting down at this slower rate. The amount of time required for counters 52 and 54 to count down to zero may be that amount of time selected to cool off motor 8. For example, this may be four minutes.

When counters 52 and 54 count down to zero, NOR gate 68 again assumes an output signal state indicating that the counters are now either full or empty. That the counters are now empty is determined by means of NOR gate 72 which receives the count down signal from inverter 56 in conductor 88 and the fourth bit signal in conductor 82 from counter 54 indicating that the counter is empty. The coincidental application of these signals to NOR gate 72 provides an output to NAND gate 94. The outputs of NOR gates 68 and 72 operate NAND gate 94 to provide a signal in conductor 96 through inverter 142 and indicator 144 extinguishing the indicator to indicate that motor 8 has cooled sufficiently to permit restarting and that overload protection circuit 10 is now in the reset condition.

Reset switch 138 may now be closed to provide the signal in conductor 96 to conductor 140 to reset circuit 102. This removes the signal in conductor 116, extinguishing overload indicator 120 and removing the bias from the base of transistor 122. Transistor 122 becomes non-conductive, deenergizing relay coil 124a and closing the contacts 124b to reconnect motor 8 to power supply 16.

The output signal from NAND gate 94 is provided to NAND gate 98. This operates NAND gate 98 to again render transistor 57 conductive to short out capacitor 38 and prevent the generation of pulses in conductor 50. Counters 52 and 54 are left in the empty condition.

With motor 10 reconnected to power supply 16, a motor current signal again appears in conductor 24. As long as this signal does not exceed that in conductor 28, the condition of motor protection circuit 10 is not altered.

Conditions may arise in which motor 8 is intermittently and sequentially subjected to overload conditions, none of which alone is sufficient to cause overload protection circuit 8 to disconnect motor 8 from power supply 16. However, this does present a potential danger to motor 8, if repeated frequently enough.

The operation of motor overload protection circuit 10 under these circumstances is as follows. Each time a signal proportional to excess current appears at junction 26, the circuitry is operated to commence counting up these pulses in counters 52 and 54. Assuming the overload condition is removed before the maximum count of 255 is reached in counters 52 and 54, counters 52 and 54 are switched to the count down condition and commence counting down at the slower rate established by the signal in conductor 55 to capacitor 38. If no overload condition rapidly reoccurs, the counters will again count down to zero. However, if the overload condition does shortly thereafter reoccur, counters 52 and 54 will resume counting up from their then current condition.

Assuming the overload conditions are repeated rapidly enough and frequently enough, the faster counting rate provided by the current from transistor 36 will ultimately cause counters 52 and 54 to count up to the maximum count. This operates motor overload protection circuit 10 to disconnect motor 8 from power supply 16 until counters 52 and 54 have been returned to the empty state by the slower pulse rate generated by the signal in conductor 55 when applied to capacitor 38. Protection is thus provided to motor 8 for conditions which individually do not exceed desired protective criteria but which cumulatively represent a hazard to the motor.

I claim:

1. A protection circuit for protecting a motor against inversely related, adverse conditions of excess current and exposure time, said motor having means associated therewith for providing a signal indicative of motor current, said protection circuit comprising:
   means generating a reference signal corresponding to a predetermined level of motor current;
   means connected to said reference signal means and said motor current signal means for producing a difference signal indicative of current in excess of the predetermined level;
   means responsive to said difference signal for generating a pulse train signal having a pulse rate corresponding to the difference signal;
   counting means coupled to said pulse train signal generating means for counting the pulses of said signal and for providing an output signal indicative of the adverse conditions when a first predetermined number of pulses have been counted;
   means connected to said difference signal producing means and to said counting means for causing said counter to count up when said motor current signal exceeds said reference signal and to count down when said reference signal exceeds said motor current signal;
   means coupled to said pulse train signal generating means for changing the pulse rate of the pulse train signal when said counter is counting down;
   output means coupled to said counting means and operable by said output signal for deenergizing the motor when adverse conditions are approached; and
   means for altering said output signal when said counter has counted down to a second predetermined number for permitting the motor to be reenergized.

2. The protective circuit according to claim 1 further including means coupled to said counting means and operable by said output signal for indicating an overload condition.

3. The protective circuit according to claim 2 further including first indicator means responsive to the signal from said difference signal producing means for providing an indication when said motor is subjected to excess current conditions.

4. The protective circuit according to claim 1 wherein said means for changing the pulse rate of the pulse train signal is further defined as reducing the pulse rate of said signals.

5. The protective circuit according to claim 1 wherein said output means includes latch means for retaining an indication that said output signal has occurred subsequent to the deenergization of the motor.

6. The protective circuit according to claim 1 further defined as protecting a direct current motor from overloading due to excess motor armature current and exposure time conditions.

7. The protective circuit according to claim 1 wherein said pulse train signal generating means comprises means for generating a current proportional to the difference signal, a capacitor chargeable by said current at a rate proportional thereto, and means for generating a pulse when said capacitor has been charged to a predetermined voltage and for discharging said capacitor for recharging.

8. The protective circuit according to claim 7 wherein said pulse train signal generating means is further defined as including first means for generating a current proportional to the difference signal for charging said capacitor and a second means for charging said capacitor independently of said first means at a slower rate than said first means.

9. The protective circuit according to claim 7 including means coupled to said counting means for preventing said counting means from counting higher than said first predetermined number or lower than said second predetermined number.

10. The protective circuit according to claim 7 including means connected to said counting means for indicating when said counter has counted to the second predetermined number after an overload condition.

* * * * *